(12) United States Patent
May

(10) Patent No.: US 9,403,486 B2
(45) Date of Patent: Aug. 2, 2016

(54) SAFETY RAILING SYSTEM AND METHOD FOR PROVIDING ACCESS TO A TANKER TRAILER

(71) Applicant: B&R Repair, Inc., Lemont, IL (US)

(72) Inventor: Randy May, Lemont, IL (US)

(73) Assignee: B&R Repair, Inc., Lemont, IL (US)

( * ) Notice: Subject to any disclaimer, the term of this patent is extended or adjusted under 35 U.S.C. 154(b) by 0 days.

(21) Appl. No.: 14/254,309

(22) Filed: Apr. 16, 2014

(65) Prior Publication Data

US 2015/0298613 A1  Oct. 22, 2015

(51) Int. Cl.
*B60R 3/00* (2006.01)

(52) U.S. Cl.
CPC ...................... *B60R 3/005* (2013.01)

(58) Field of Classification Search
CPC ....... B60R 3/005; E04G 5/14; E04G 21/3233; E04G 21/3228
See application file for complete search history.

(56) References Cited

U.S. PATENT DOCUMENTS

| 933,740 | A | * | 9/1909 | Bond | 182/62 |
|---|---|---|---|---|---|
| 1,295,453 | A | | 2/1919 | Edland | |
| 3,023,631 | A | | 3/1962 | Bevis | |
| 4,371,056 | A | * | 2/1983 | Anglade | 182/127 |
| 4,572,328 | A | * | 2/1986 | Benko | 182/1 |
| 4,936,407 | A | * | 6/1990 | Brock et al. | 180/271 |
| 5,213,367 | A | | 5/1993 | Norman et al. | |
| 5,577,279 | A | * | 11/1996 | Foster et al. | 5/618 |
| 5,921,531 | A | * | 7/1999 | Early | 256/67 |
| 5,967,258 | A | | 10/1999 | Scott et al. | |
| 6,045,157 | A | * | 4/2000 | Poulin | 280/830 |
| 2003/0020253 | A1 | * | 1/2003 | Albert Bosman et al. | 280/164.1 |
| 2004/0173406 | A1 | * | 9/2004 | Lantz | 182/113 |
| 2008/0298942 | A1 | * | 12/2008 | Gregg et al. | 414/545 |
| 2012/0048648 | A1 | * | 3/2012 | Meacham | 182/113 |
| 2012/0318178 | A1 | | 12/2012 | Hanks et al. | |

FOREIGN PATENT DOCUMENTS

| FR | 2087219 A5 * | 12/1971 | B60R 3/005 |
|---|---|---|---|
| GB | 926289 A * | 5/1963 | B60R 3/005 |
| WO | WO 2007059771 A1 * | 5/2007 | B60R 3/005 |

* cited by examiner

*Primary Examiner* — Alvin Chin-Shue
*Assistant Examiner* — Kristine Florio
(74) *Attorney, Agent, or Firm* — Patents+TMS, P.C.

(57) ABSTRACT

A safety railing system and a method provide a walkway on a tanker trailer so that a user may access the top of the tanker trailer. A ladder provides access to the walkway connected to a frame on the tanker trailer. A railing adjacent to the walkway provides a handrail for the user. A lever pivots relative to the frame to move the railing from a collapsed position to an upright position for use. The railing locks in the upright position for use and also locks in the collapsed position for stowage during transport of the tanker trailer.

16 Claims, 3 Drawing Sheets

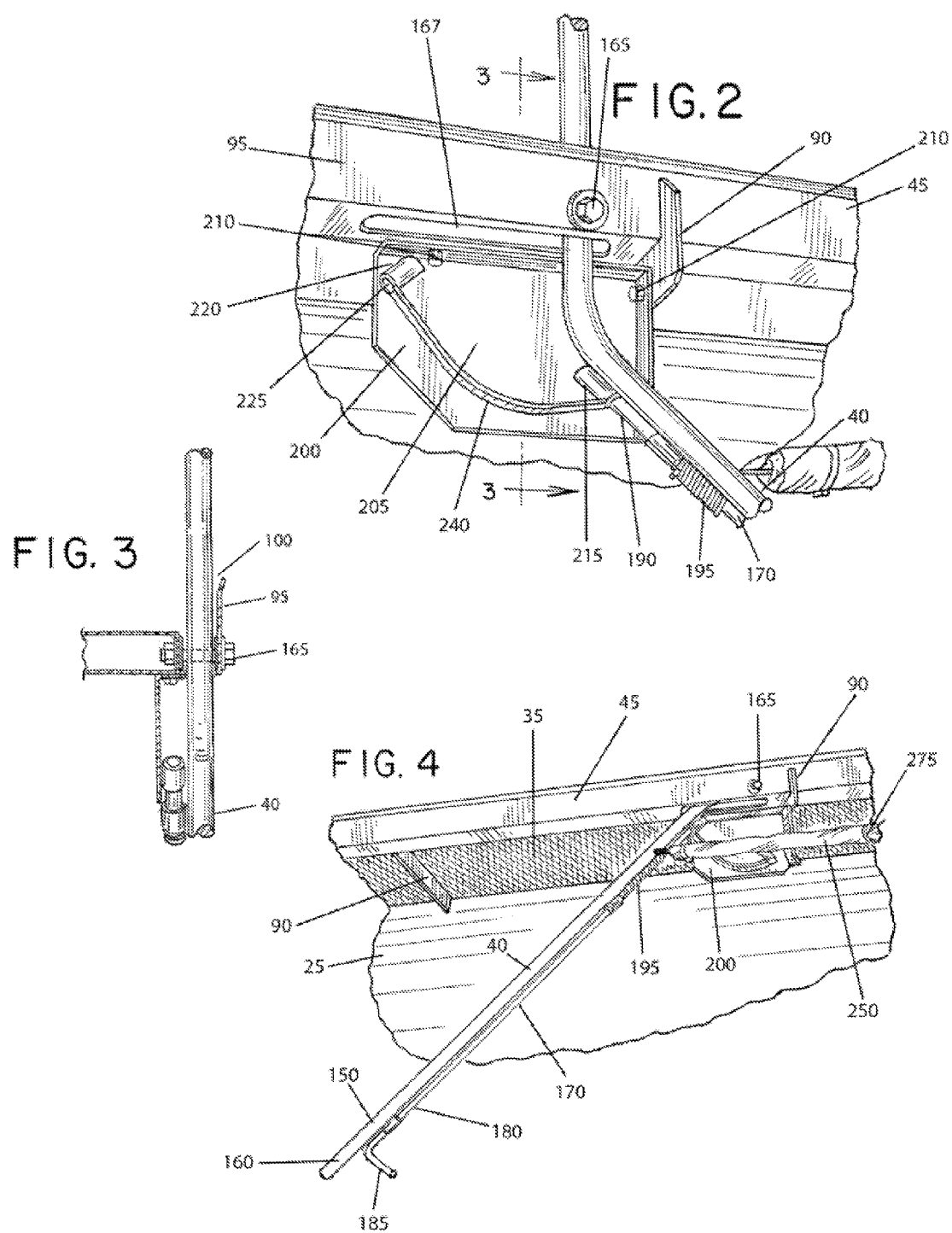

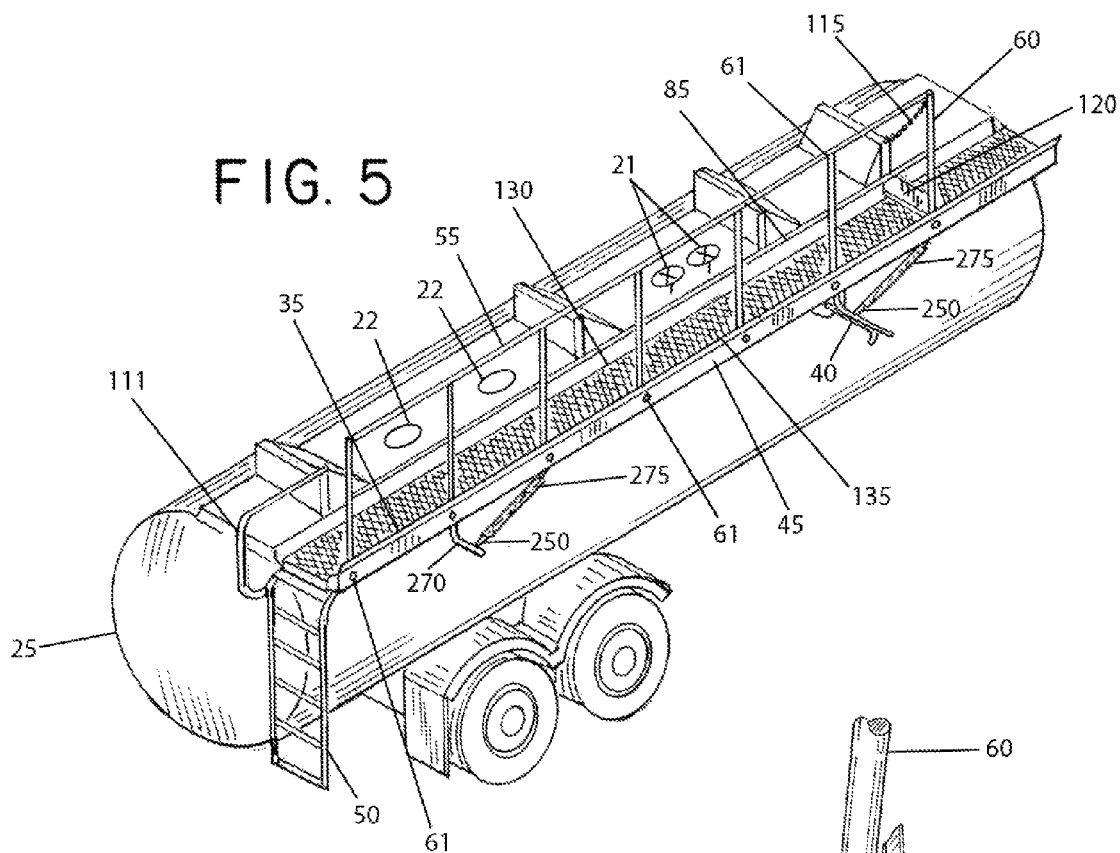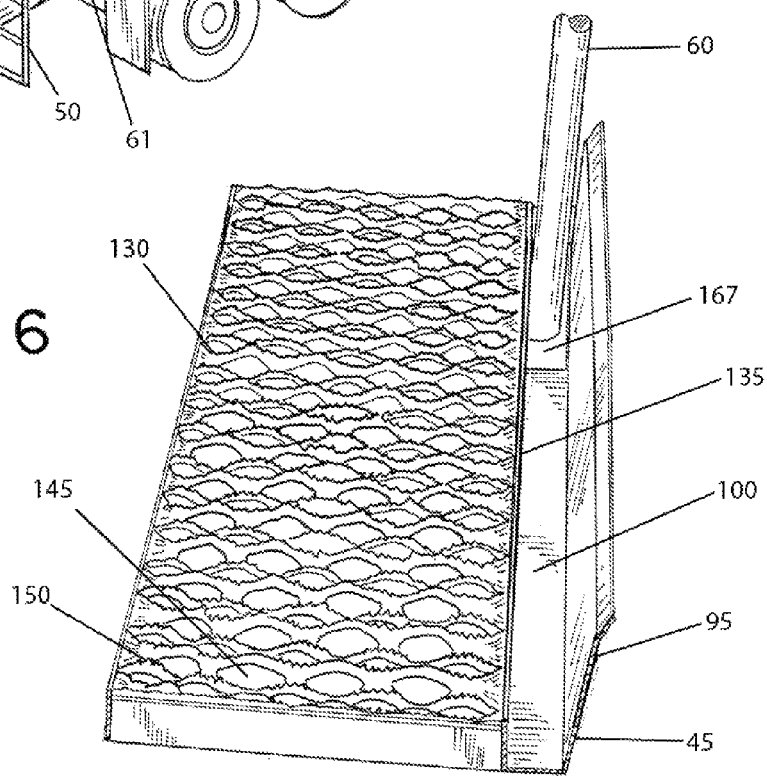

SAFETY RAILING SYSTEM AND METHOD FOR PROVIDING ACCESS TO A TANKER TRAILER

BACKGROUND OF THE INVENTION

The present invention generally relates to a safety railing system. More specifically, the present invention relates to a safety railing system that is designed to provide safety railing along the tops of mobile equipment, namely tanker trailers.

Truck trailers are generally known and may haul a variety of materials from a first loading location to a second receiving location. Trucks may transport various types of trailers. The type of trailer selected for use may depend on the product and/or materials that are transported.

One type of trailer commonly used to transport materials is a tanker trailer. A tanker trailer typically transports liquid materials. For example, gasoline, milk, water and liquid nitrogen are commonly transported using a tanker trailer. In addition, the tanker trailer may also transport gases or dry bulk cargo. For example, grain, coal or gravel may be transported using the tanker trailer.

The tanker trailer has a unique design that distinguishes the tanker trailer from most other known trailers. The tanker trailer has a cylindrical storage tank that stores materials during transit; most other trailers are rectangular. The tanker trailer is typically equipped with access valves to check the contents of the tank and loading and/or unloading of the contents of the tank. The access valves are commonly located on the top of the cylindrical tank. Thus, access to the top of the cylindrical storage tank may be necessary to inspect and/or to operate the valves.

Government agencies such as the Occupational Safety and Health Administration (OSHA) have promulgated regulations designed to create a safer work environment for industrial workers. Regulations have focused on methods and equipment used to access mobile equipment, such as tanker trailers. Typically, trailers are not hazardous to access the contents of the trailer. The contents normally are loaded into the back of the trailer using either a loading dock and/or a ramp.

On the other hand, the tanker trailer is often hazardous to load and/or unload the contents of the tanker trailer. The access valve is typically located on the top of the tanker trailer. A person may be required to walk on the top of the tanker trailer to reach the access valve. Loading the storage tank on the tanker trailer creates a greater hazard than loading the typical rectangular trailer. The rounded exterior edge on top of the storage tank of the tanker trailer is difficult to traverse on foot. The rounded exterior edge often causes the person walking on the top of the tanker trailer to lose his or her balance and/or slip and/or even fall from the tanker trailer. The person walking on top of the tanker trailer is likely to fall off the tanker trailer.

As a result, a loading platform is often used to load and/or to unload the tanker trailer. The loading platform may have a stairway leading to a platform. The tanker trailer may park parallel to the platform such that the person may reach the access valve from the platform. The hazards associated with loading and/or unloading the tanker trailer may be present if the receiving destination does not have the loading platform. Moreover, the hazards may be present if the driver must check the contents of the storage tank during transit.

A need, therefore, exists for a safety railing system that provides safety railing along the top of a tanker trailer. Further, a need exists for a safety railing system that is attached to the tanker trailer so that the safety railing may be present.

SUMMARY OF THE INVENTION

The present invention generally relates to a safety railing system. More specifically, the present invention relates to a safety railing system that is designed to provide safety railing along the tops of mobile equipment, namely a tanker trailer.

To this end, in an embodiment of the present invention, a railing system is provided. The railing system has a walkway with a first end and a second end. The walkway is substantially horizontal and has an inner side and an outer side. A frame is connected to the outer side of the walkway. A railing has a handrail and uprights. The uprights pivot relative to the handrail. Further, the uprights connect to the frame and pivot relative to the frame. A lever connects to the frame and pivots relative to the frame. The lever moves the railing from a collapsed position to an upright position.

In another embodiment, a method for accessing a top of a trailer is provided. The method has the steps of attaching a railing system having a walkway and a railing to the top of the trailer wherein the walkway is substantially horizontal; connecting a lever to the railing; moving the lever to place the railing in an upright position wherein the railing is vertical and perpendicular to the walkway; and moving the lever to place the railing in a collapsed position wherein the railing is adjacent to the walkway.

It is, therefore, an advantage of the present invention to provide a safety railing system for a tanker trailer.

An advantage of the present invention is to provide a safety railing system that may provide the driver of the truck with access to the top of the trailer.

Another advantage of the present invention is to provide a safety railing system that may provide the driver with access to an access valve on the top of the tanker trailer.

Yet another advantage of the present invention is to provide a safety railing system that may have a ladder to allow a person to climb the ladder to access a walkway on the top of the tanker trailer.

Still another advantage of the present invention is to provide a safety railing system that may allow a person to walk at or near the top of the tanker trailer.

Another advantage of the present invention is to provide a safety railing system that may protect and/or prevent a person from falling from the tanker trailer.

Yet another advantage of the present invention is to provide a safety railing system that may be attached to the tanker trailer.

Another advantage of the present invention is to provide a safety railing system that may have a railing height which complies with the requirements of OSHA.

Yet another advantage of the present invention is to provide a safety railing system that may pivot from a collapsed position to an upright position.

Still another advantage of the present invention is to provide a safety railing system that may travel with the tanker trailer.

A further advantage of the present invention is to provide a safety railing system that may support up to six hundred pounds.

Another advantage of the present invention is to provide a safety railing system that may allow the driver to transition the railing from a collapsed position to an upright position.

Moreover, another advantage of the present invention is to provide a safety railing system that may allow the driver of the tanker truck to transition the railing from an upright position to a collapsed position.

Still another advantage of the present invention is to provide a safety railing system that may allow the driver to lock the railing in an upright position.

Further, an advantage of the present invention is to provide a safety railing system that may allow the driver to lock the railing in a collapsed position.

Additional features and advantages of the present invention described in, and will be apparent from, the detailed description of the presently preferred embodiments and from the drawings.

BRIEF DESCRIPTION OF THE DRAWINGS

FIG. 2 is a perspective view of an embodiment of the present invention illustrating the safety railing in an upright position.

FIG. 3 is a cross-sectional view of an embodiment of the safety railing of the present invention taken along line 3-3 of FIG. 2.

FIG. 4 is a perspective view of an embodiment of the present invention illustrating the safety railing in a collapsed position.

FIG. 5 is a side view of an embodiment of the present invention illustrating a lever for operating the safety railing.

FIG. 6 is a perspective view of an embodiment of the safety railing system of the present invention on the tanker trailer.

DETAILED DESCRIPTION OF THE DRAWINGS

Figure 1:
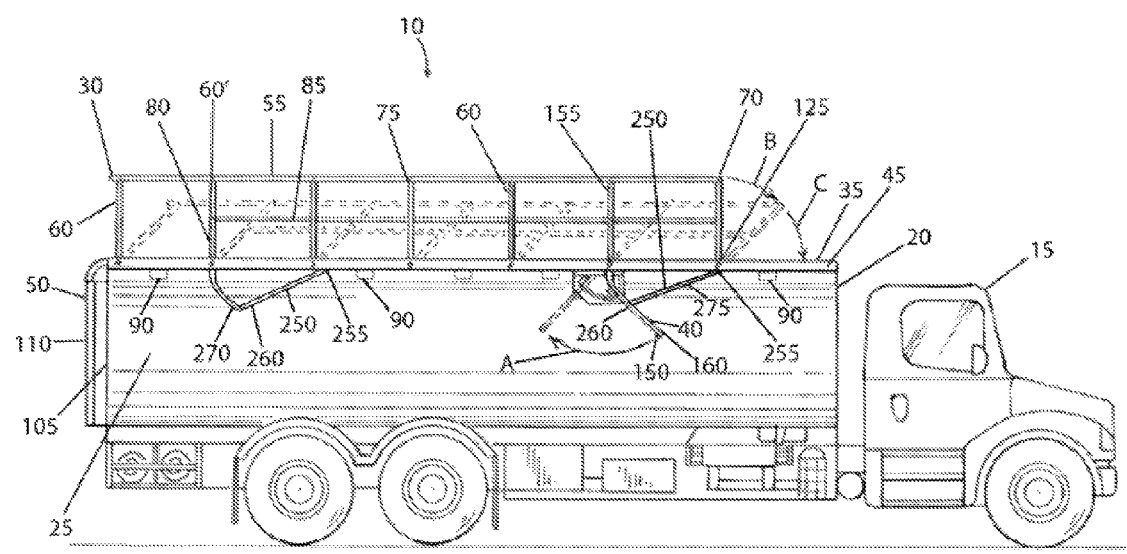
FIG. 1 is a side view of an embodiment of a safety railing system of the present invention on a tanker trailer.

The present invention generally relates to a safety railing system. More specifically, the present invention relates to a safety railing system that is designed to provide a safety railing along a top of mobile equipment, namely a tanker trailer.

Referring now to the drawings, wherein like numerals refer to like parts, FIGS. 1-4 illustrate an embodiment of a safety railing system 10. As illustrated in FIG. 1, the safety railing system 10 may be installed on a truck 15. In an embodiment, the safety railing system 10 may be connected to a tanker trailer 20 connected to the truck 15. The tanker trailer 20 may have a storage tank 25. Typically, the storage tank 25 may have a generally cylindrical shape. However, the tanker trailer 20 may have other shapes depending on the product and/or material transported by in the tanker trailer 20. The present invention may be used with the different shapes. The tanker trailer 20 may transport liquid materials in the storage tank 25. However, other types of materials may be stored and/or transported in the storage tank 25.

The tanker trailer 20 may also be equipped with valves 21 and/or ports 22 as shown in FIG. 5. The valves 21 and/or the ports 22 may be used for loading and/or unloading the contents of the storage tank 25. The valves 21 and/or the ports 22 may also be used for checking the contents of the storage tank 25. The valves 21 and/or the ports 22 may be located on the bottom and/or the top of the storage tank 25. The valves and/or the ports that may be located on the bottom of the storage tank 25 may be accessed from the ground. However, in certain situations, a person may require access to the top of the storage tank 25 to operate and/or to inspect the valves 21 and/or ports 22 that may be located on the top of the storage tank 25. For example, a person loading the storage tank 25, a truck driver inspecting the contents of the storage tank 25 and/or a person unloading the storage tank 25 may require access to the top of the tanker trailer 20.

For example, to access the top of the tanker trailer 20, a person may use the safety railing system 10 of the present invention. In an embodiment shown in FIG. 1, the safety railing system 10 may have a railing 30, a walkway 35, a lever 40 and a frame 45. The railing 30 may be collapsible. In an embodiment, the safety railing system 10 may also have a ladder 50.

The tanker trailer 20 may have an existing ladder which may be used with an embodiment of the present invention. In another embodiment, the safety railing system 10 may use the existing ladder on the tanker trailer 20.

In an embodiment, the safety railing system 10 may be operated by a person on the ground adjacent to the tanker trailer 20 when the truck 15 is parked. The railing 30 may be placed into two positions. The railing 30 may be in a collapsed position and/or may stand perpendicular to the walkway 35 when in an upright position.

For example, the railing 30 may be in a collapsed position. In the collapsed position, the railing 30 may be on the top of the tanker trailer 20. Also, the railing 30 may be locked in the collapsed position. With the truck 15 in motion and/or traveling on a roadway, preferably, the railing 30 may be locked in the collapsed position during operation of the truck 15.

When a user may desire to gain access to the top of the tanker trailer 20, the user may place the railing 30 in the upright position for safety. After the railing 30 is in the upright position, the railing 30 may be locked in the upright position.

In an embodiment, the railing 30 may have a handrail 55 and uprights 60. The handrail 55 may be generally horizontal, and the uprights 60 may be generally vertical in the upright position. The uprights 60 may also be spaced a distance apart from each other as shown in FIG. 1. Further, the uprights 60 may be provided from a rear end 65 of the railing 30 to a front end 70 of the railing 30.

A top end 75 of the uprights 60 may connect to the handrail 55 on the railing 30. In an embodiment, the connection between the top end 75 of the uprights 60 and the handrail 55 may be a bolt 61. However, a pin, rod, screw and/or the like may also be used. The bolt 61 may pass though a hole in the top end 75 of the uprights 60. The bolt 61 may be sized to allow movement of the top end 75 of the uprights 60 relative to the handrail 55. Thus, the top end 75 of the uprights 60 may pivot relative to the handrail 55 of the railing 30.

A bottom end 80 of the uprights 60 may be connected to the frame 45. The same type of connection used with the top end 75 of the uprights 60 and the handrail 55 may be used between the bottom end 80 of the uprights 60 and the frame 45. The bolt 61 may allow the bottom end 80 of the uprights 60 to pivot relative to the frame 45.

The safety railing system 10 may also have a horizontal support 85. The horizontal support 85 may be connected to the uprights 60. The horizontal support 85 may be connected between the top end 75 of the uprights 60 and the bottom end 80 of the uprights 60. The horizontal support 85 may also provide added strength, rigidity and/or safety to the safety railing system 10. For example, the horizontal support 85 may be located between the handrail 55 and the walkway 35. As shown in FIG. 1, the horizontal support 85 may be located midway between the handrail 55 and the walkway 35. Thus, the horizontal support 85 may provide a safety barrier under the handrail 55 to prevent a person from falling from the top of the tanker trailer 20. A user may also hold onto the horizontal support 85 for stability on the walkway 35. The user may hold onto the horizontal support 85, for example, during an inspection and/or an operation using the valves 21 and/or the ports 22 on the top of the tanker trailer 20.

When in the upright position, the handrail 55 may have a height that may comply with the safety requirements for a railing height established by industry standards, OSHA and/or other government agency. The handrail 55 may also be made of tubular aluminum, stainless steel and/or the like. The rounded shape of the handrail 55 may provide a handle for the user. The user may slide his or her hand along the handrail 55 while traversing the walkway 35 to provide contact with the railing 30 for added safety.

In an embodiment, the frame 45 may be secured to the walkway 35 of the safety railing system 10. The frame 45 may be secured to the walkway 35 with supports 90. The supports 90 may be connected to the underside of the walkway 35 as shown in FIGS. 4 and 5. The supports 90 may be connected to the walkway 35 by bolting, welding and/or other ways of making connections. The supports 90 may be spaced at intervals along the underside of the walkway 35. The supports 90 may also provide rigidity to the walkway 35.

As shown in the drawings, the frame 45 may have a sidewall 95 on the outer portion of the frame 45. The frame 45 may have an open top side forming a channel 100. In the collapsed position, the railing 30 may be contained within the channel 100 of the frame 45. As shown in FIG. 1, the frame 45 may extend beyond the front end 70 of the railing 30. Thus, the upright 60 at the front end 70 of the railing 30 may fold to collapse into the channel 100 of the frame 45.

Referring to FIG. 1, the ladder 50 may be located at a back end 105 of the tanker trailer 20. The ladder 50 may attach to the walkway 35 at the top of the tanker trailer 20. The ladder 50 may have handrails 110 which may extend to the top of the tanker trailer 20 adjacent to the rear end 65 of the railing 30. A user may climb to the top of the ladder 50 using the handrails 110. Thus, the user may maintain points of contact while climbing the ladder 50. For example, the user may have both hands on the handrails 110 and one foot on the ladder for safe climbing while ascending the ladder 50. The user may then climb the ladder 50 to the top of the tanker trailer 20. In an embodiment, the user may also hold a side rail 111 connected to the ladder 50 and the tanker trailer 20. The user may step onto the walkway 35. The user may also hold the railing 30 while walking on the walkway 35 from the rear end 65 of the railing 30 to the front end 70 of the railing 30.

The walkway 35 may extend along the length of the top of the tanker trailer 20. As shown in FIG. 6, the walkway 35 may have safety chains 115 and a toe kick 120 that may be located at a front end 125 of the walkway 35. One end of the safety chains 115 may be anchored to the tanker trailer 20 and/or an inner edge 130 of the walkway 35. The other end of the safety chains 115 may be connected by the user to the railing 30 located on an outer edge 135 of the walkway 35. One of the safety chains 115 may be connected adjacent to the handrail 55 on the railing 30 and another of the safety chains 115 may be connected adjacent to the horizontal support 85 on the railing 30. The safety chains 115 may allow the railing 30 to be secured to the tanker trailer 20. Thus, the safety chains 115 may extend from the inner edge 130 of the walkway 35 to the outer edge 135 of the walkway 35. The safety chains 115 may span the width of the walkway 35 to prevent the user from falling off the front end 125 of the walkway 35 and/or the tanker trailer 20.

In addition, the toe kick 120 that may be located at the front end 125 of the walkway 35 may extend from the inner edge 130 of the walkway 35 to the outer edge 135 of the walkway 35 to prevent the user from falling off the front end 125 of the walkway 35 and/or the tanker trailer 20. The toe kick 120 may extend vertically from the walkway 35. The height of the toe kick 120 may prevent the user from sliding off the walkway 35 in wet conditions, for example.

FIG. 6 also illustrates a surface 140 of the walkway 35. The surface 140 of the walkway 35 may be a perforated, anti-slip surface. In an embodiment, the walkway 35 may be aluminum or stainless steel.

In an embodiment, the surface 140 of the walkway 35 may have an open design. As shown, the surface 140 may have openings 145 and/or may be perforated. The openings 145 may have jagged edges 150 to improve traction for the user on the walkway 35, particularly in wet weather, such as rain and/or snow. The open design of the surface 140 of the walkway 35 may also prevent snow and/or ice from accumulating on the walkway 35 thereby improving safety for the user walking on the walkway 35 during winter conditions. In an embodiment, the jagged edges 150 on the surface 140 of the walkway 35 may be anti-slip perforations. The open design of the surface 140 of the walkway 35 may also provide improved traction and/or may provide less slippage than a solid surface, such as, for example, diamond plate.

The open design of the surface 140 of the walkway 35 may also reduce the weight of the walkway 35 compared to a solid surface on the walkway 35. The open design may require less material to construct. As a result, the weight of the walkway 35 and/or the safety railing system 10 may be reduced. Towing a tanker trailer 20 with such a reduction in weight may improve the fuel mileage of the truck 15. Also, a lighter weight safety railing system 10 may be easier to install.

In an embodiment, the lever 40 may have a first end 150 and a second end 155. As shown in FIGS. 1 and 5, the second end 155 may be located in a position opposite to the first end 150. The first end 150 may have a handle 160. The handle 160 may be held by the user during operation of the safety railing system 10. The second end 155 of the lever 40 may connect to the handrail 55 with the bolt 61.

The lever 40 may be connected to the frame 45 at a point between the first end 150 of the lever 40 and the second end 155 of the lever 40. The lever 40 may be connected by a bolt 165 as shown in FIGS. 1-5. The lever 40 may pivot on the bolt 165 so that the lever 40 may pivot relative to the frame 45. The lever 40 may move the railing 30 from the collapsed position to the upright position. The lever 40 may pass through a slot 167 in the frame 45. The slot 167 may allow the lever 40 be moved from the forward position to the rearward position.

In an embodiment shown in FIG. 5, the lever 40 may also have an actuating rod 170. The actuating rod 170 may be substantially parallel to the lever 40. The actuating rod 170 may have a first end 175 and a second end 180. The first end 175 may have an actuating handle 185. The second end 180 may have a plunger 190 and a spring 195. The actuating handle 185 may be located at the first end 175 of the actuating rod 170 and may be pulled by the user to retract the plunger 190 at the second end 180 of the actuating rod 170.

In an embodiment, the safety railing system 10 may have a locking mechanism 200. As shown in FIGS. 1-5, the locking mechanism 200 may have a base plate 205. The base plate 205 may be connected to the frame 45 and/or the supports 90. The base plate 205 may be welded to the frame 45 and/or the supports 90. The base plate 205 may also be connected with bolts 210.

In an embodiment, the locking mechanism 200 may have a first locking end 215 and a second locking end 220 as shown in FIGS. 2 and 4. The second locking end 220 may be located in a position opposite to the first locking end 215. The first locking end 215 and the second locking end 220 may be cylindrical in shape and may have an opening 225. The opening 225 may be sized to receive the plunger 190.

For example, FIG. 2 illustrates the plunger 190 inserted into the opening 225 of the first locking end 215. FIG. 4 illustrates the plunger 190 inserted into the opening 225 of the second locking end 220. The spring 195 may urge the plunger 190 into the opening 225 and may help maintain the plunger 190 in the opening. Thus, the lever 40 and the actuating rod 170 may be locked in the first locking end 215 when the railing 30 may be in the upright position shown in FIG. 2. The lever 40 and the actuating rod 170 may be locked in the second locking end 220 when the railing 30 may be in the collapsed position shown in FIG. 4. The locking mechanism 200 may also have a guide rail 240. The guide rail 240 may extend from the first locking end 215 to the second locking end 220. The guide rail 240 may be curved between the first locking end 215 and the second locking end 220.

In operation, the plunger 190 may be retracted from the opening 225 in the first locking end 215 by the user who may pull the actuating handle 185 on the actuating rod 170. The plunger 190 may then glide on the guide rail 240 on the locking mechanism 200 as the user moves the lever 40 toward the second locking end 220. The spring 195 on the actuating rod 170 may provide force so that the plunger 190 remains in a position against the guide rail 240 during the transition of the lever 40 from one position to another.

In an embodiment, the safety railing system 10 may have a tensioner 250 as shown in FIGS. 1 and 5. For example, the tensioner 250 may be a spring, a hydraulic actuator and/or the like. The tensioner 250 may have a first end 255 and a second end 260. The second end 260 may be located in a position opposite to the first end 255. The first end 255 may be connected to the frame 45 and the second end 260 may be connected to the lever 40.

Further, the tensioner 25 may move the railing 30 from the collapsed position to the upright position. For example, in the collapsed position, the tensioner 250 may be under tension. The user may unlock the plunger 190 of the actuating rod 170 from the locking mechanism 200. Then, the tensioner 250 may provide additional force to the lever 40 to aid the user in moving the railing 30 to the upright position. As shown in FIG. 1, the tensioner 250 may be connected to one of the uprights 60. For example, upright 60' may have an elongated lower portion 270. The tensioner 250 may be connected to the elongated lower portion 270 of upright 60' to aid the user in moving the railing 30 to the upright position. Thus, the first end 255 of the tensioner 250 may be connected to the frame 45 and the second end 260 may be connected to the upright 60'.

The tensioner 250 may have a cover 275 to prevent the tensioner 250 from impinging on the locking mechanism 200, for example. The cover 275 may prevent the tensioner 250 from entangling and/or interfering with the locking mechanism 200.

As shown in FIG. 1, the railing 30 may be repositioned into a partially collapsed position and/or a fully collapsed position. For example, the lever 40 may be moved by the user from the forward position to a rearward position indicated by arrow A. The railing 30 may move from the upright position as indicated by arrow B to the partially collapsed position in which the railing 30 is shown in dashed lines in FIG. 1. The railing 30 may also move as indicated by arrow C to the fully collapsed position shown in FIG. 1.

In the collapsed position, the railing 30 may be positioned within the channel 100 of the frame 45. As shown in FIG. 1, the frame 45 may extend beyond the front end 70 of the railing 30. Thus, the upright 60 at the front end 70 of the railing 30 may pivot and/or may fold forward to collapse into the channel 100 of the frame 45. Thus, the railing 30 may be stored in the channel 100 in the collapsed position.

The safety railing system 10 may lock and/or secure the railing 30 in the collapsed position and/or the upright position. The railing 30 may be locked in position using the locking mechanism 200.

It should be understood that various changes and modifications to the presently preferred embodiments described herein will be apparent to those skilled in the art. Such changes and modifications may be made without departing from the spirit and scope of the disclosure and without diminishing its attendant advantages. It is, therefore, intended that such changes and modifications be covered by the appended claims.

I claim:

1. A railing system comprising:
a walkway having a top surface that is generally planar, a bottom surface positioned opposite to the top surface, an inner side and an outer side that are connected to the top surface and are substantially perpendicular with respect to the top surface wherein the top surface has a first end and a second end wherein the second end is located opposite to the first end wherein the inner side and the outer side extend from the first end of the top surface to the second end of the top surface;
a frame connected to the outer side of the walkway and having a channel and a side wall wherein the channel extends below the top surface and separates the side wall from the walkway;
a railing having a handrail and uprights wherein the uprights extend from the channel and connect to the handrail wherein the uprights pivot relative to the handrail wherein the uprights connect to the frame and further wherein the uprights pivot relative to the frame;
a lever connected to the railing through a slot extending through the frame to define an opening in the frame wherein the lever extends through the opening and moves within the opening as the railing moves between the collapsed position and the upright position wherein the lever pivots relative to the frame and further wherein the lever moves the railing from a collapsed position to an upright position wherein the uprights are generally perpendicular with respect to the top surface in the upright position and further wherein the uprights are located within the channel in the collapsed position;
a rod extending from the lever and having a length defined between a first end and a second end positioned opposite the first end wherein the rod has a spring, a handle on the first end of the rod and a plunger on the second end of the rod;
a plate mounted to the frame wherein the plate is generally planar and is substantially perpendicular with respect to the walkway; and
wherein a perpendicular guide rail is connected to the plate and having a curve having a first locking end and a second locking end wherein the first locking end is positioned remotely from the second locking end wherein the rod and the lever move from a first position adjacent to the first locking end to a second position adjacent to the second locking end wherein the plunger contacts the curve as the rod and the lever move between the first position and the second position wherein the first locking end and the second locking end are shaped to enclose the plunger wherein the plunger extends into the first locking end in the first position to secure the railing in the upright position wherein the spring applies a force to the plunger to move the plunger in the first locking end wherein the handle applies a force to the spring and retracts the plunger from the first locking end wherein the plunger extends into the second locking end in the second position to secure the railing in the collapsed position and further wherein the spring applies a force to move the plunger in the second locking end.

2. The system of claim 1 further comprising:
a ladder connected to the first end of the walkway wherein the ladder is substantially perpendicular with respect to the walkway and extends below the walkway.

3. The system of claim 1 further comprising:
a safety chain having a length defined between a first end and a second end positioned opposite of the first end wherein the first end of the safety chain is connected to the inner side of the walkway and further wherein the second end of the safety chain is connected to the railing.

4. The system of claim 1 further comprising:
a toe kick located at the second end of the walkway and extending between the inner side and the outer side wherein the toe kick is substantially perpendicular with respect to the top surface and extends above the top surface.

5. The system of claim 1 further comprising:
a tensioner having a length defined between a first end and a second end located opposite to the first end wherein the first end of the tensioner is connected to the frame and the second end of the tensioner is connected to the lever and further wherein the tensioner forces the rod and the lever to move the railing to the upright position.

6. The system of claim 1 further comprising:
supports secured to the bottom surface of the walkway and extending from the inner side to the outer side wherein the supports connect the walkway to the frame and further wherein the supports extend substantially vertically with respect to the bottom surface of the walkway.

7. The system of claim 1 further comprising:
a railing support connected to the uprights wherein the railing support is connected to the uprights in a substantially horizontal manner wherein the uprights pivot relative to the railing support.

8. The system of claim 1 wherein the handrail is tubular.

9. The system of claim 1 further comprising:
an upright having an elongated portion extending below the frame wherein the upright is connected to the handrail and is substantially parallel to the uprights.

10. The system of claim 1 wherein the lever extends from one of the uprights of the railing.

11. A method for accessing a top of a trailer comprising the steps of:
attaching a walkway and a railing having uprights and a handrail to the top of the trailer wherein the walkway has a top surface, a first side and a second side positioned opposite the first side wherein the first side and the second side are connected to and perpendicular to the top surface wherein the second side is further from the top of the trailer than the first side wherein the top surface and the handrail are substantially horizontal with respect to the top of the trailer wherein the uprights have a length defined between a first end and a second end positioned opposite the first end wherein the first end connects to the railing and the second end is adjacent to the second side wherein the uprights are substantially perpendicular to the handrail and to the walkway in an upright position of the railing and further wherein the handrail and the first end are adjacent to second side in a collapsed position of the railing;
attaching a base plate having a planar surface to the walkway wherein the base plate has a guide rail extending perpendicularly outward from the planar surface of the base plate and further wherein the guide rail has a curve defined between a first locking end and a second locking end;
connecting a lever and a plunger to the railing wherein the plunger is connected to and extends from the lever;
moving the lever to place the railing in the upright position;
maintaining the plunger against the curve of the guide rail as the lever moves the railing to the upright position;
moving the lever to place the railing in the collapsed position; and
maintaining the plunger against the curve of the guide rail as the lever moves the railing to the collapsed position.

12. The method of claim 11 further comprising the step of:
connecting a ladder to the trailer to access the walkway.

13. The method of claim 11 further comprising the step of:
locking the railing system in the upright position by inserting the plunger in the first locking end on the guide rail.

14. The method of claim 11 further comprising the step of:
locking the railing system in the collapsed position by inserting the plunger in the second locking end on the guide rail.

15. The method of claim 11 further comprising the step of:
connecting a safety chain to the trailer and to the railing system.

16. The method of claim 11 further comprising the step of:
pivoting the railing from the collapsed position to the upright position using the lever while standing on the ground.

* * * * *